(12) United States Patent
Lohman

(10) Patent No.: US 6,714,957 B1
(45) Date of Patent: Mar. 30, 2004

(54) SYSTEM AND METHOD FOR EFFICIENT PROCESSING OF DENORMAL RESULTS AS HARDWARE EXCEPTIONS

(75) Inventor: Jeffrey A. Lohman, Plano, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/477,092

(22) Filed: Jan. 4, 2000

(51) Int. Cl.[7] ............................................... G06F 5/01
(52) U.S. Cl. ...................................................... 708/498
(58) Field of Search ................... 708/498, 553, 708/525, 205

(56) References Cited

U.S. PATENT DOCUMENTS

| | | | | |
|---|---|---|---|---|
| 5,550,767 A | * | 8/1996 | Taborn et al. | 708/205 |
| 5,602,769 A | * | 2/1997 | Yu et al. | 708/235 |
| 5,903,479 A | * | 5/1999 | Schwarz et al. | 708/205 |
| 6,219,684 B1 | * | 4/2001 | Saxena et al. | 708/496 |

* cited by examiner

*Primary Examiner*—David H. Malzahn

(57) ABSTRACT

There is disclosed a denormal handling circuit for use in a pipelined floating point unit containing an addition pipe and/or a multiplication pipe. The denormal result handling circuit comprises a denormal condition detection circuit associated with at the addition pipe and/or the multiplication pipe for examining a first operand and a second operand loaded into the addition pipe and/or the multiplication pipe and detecting a potential denormal condition. The denormal condition indicates that a calculated result generated from the first and second operands may be a denormal result. The denormal condition detection circuit, in response to detection of a potential denormal condition, prevents an additional operation from being loaded into the addition pipe and/or the multiplication pipe. The denormal result handling circuit also comprises a complex rounding unit for receiving the calculated result from the addition pipe and/or the multiplication pipe and, in response to the detection of the potential denormal condition, rounding the calculated result.

20 Claims, 4 Drawing Sheets

SYSTEM AND METHOD FOR EFFICIENT PROCESSING OF DENORMAL RESULTS AS HARDWARE EXCEPTIONS

TECHNICAL FIELD OF THE INVENTION

The present invention is directed, in general, to processing systems and, more specifically, to a microprocessor having a floating point unit capable of handling tiny (denormal) results.

BACKGROUND OF THE INVENTION

The demand for ever-faster computers requires that state-of-the-art microprocessors execute instructions in the minimum amount of time. Microprocessor speeds have been increased in a number of different ways, including increasing the speed of the clock that drives the processor, reducing the number of clock cycles required to perform a given instruction, implementing pipeline architectures, and increasing the efficiency at which internal operations are performed. This last approach usually involves reducing the number of steps required to perform an internal operation.

Efficiency is particularly important in the floating point unit of a microprocessor. In floating point representation, every number may be represented by a significand (or mantissa) field, a sign bit, and an exponent field. Although the size of these fields may vary, the IEEE-754 standard defines the most commonly used floating point notation and forms the basis for floating point units (FPUs) in x86 type processors. The IEEE-754 standard includes a signal precision format, a single extended precision format, a double precision format, and a double extended precision format. Single precision format comprises 32 bits: a sign bit, 8 exponent bits, and 23 significand bits. Single extended precision format comprises 44 bits: a sign bit, 11 exponent bits, and 32 significand bits. Double precision format comprises 64 bits: a sign bit, 11 exponent bits, and 52 significand bits. Double extended precision format comprises 80 bits: a sign bit, 15 exponent bits, and 64 significand bits.

It can be advantageous in a load-store implementation of IEEE-754 to represent all numeric values contained in the register file in the floating point unit as properly rounded values in a proprietary internal format with range and precision exceeding the widest supported IEEE-754 parameters. One such proprietary format is disclosed in U.S. patent application Ser. No. 09/377,140, entitled "Formatting Denormal Numbers for Processing in a Pipelined Floating Point Unit," which is commonly assigned to the assignee of the present application. The disclosure of application Ser. No. 09/377,140 is hereby incorporated by reference into the present disclosure as if fully set forth herein. The internal proprietary format disclosed in U.S. patent application Ser. No. 09/377,140 comprises 93 bit: a sign bit, 17 exponent bits, and 70 significand bits, and a 5 bit tag field.

Complete implementations of the IEEE-754 floating-point standard must perform rounding and status generation for all possible results, including tiny (denormal) results. The base number for IEEE floating-point standards is understood to be binary. A "normal" floating-point number is one which begins with the first non-zero digit in front of the binary "decimal" point and a denormal number is one that begins with the first non-zero digit after the decimal point. The accuracy or precision of the number is determined by the number of digits after the decimal point.

Computers, including microprocessors, typically manipulate numbers in binary format. When operating in floating-point binary format, a microprocessor expects a normal floating-point binary number. As noted above, the normal floating-point binary number in the IEEE-754 format is understood to have a mantissa which begins with a 1, followed by the binary point, followed by subsequent 1's and 0's. Thus, the characterization of the mathematical result as tiny or denormal is a function of the exponent. Small denormal numbers which have been formatted to appear as normal numbers are often referred to as pseudo-denormal or pseudo-denormalized numbers.

In implementations where very small or tiny numbers are rarely expected, tiny results are frequently handled by microcode or software exceptions. On the other hand, highly pipelined implementations make no assumptions about the frequency of tiny numbers and tiny results are fully supported in both the addition and multiplication pipelines. The frequent processing of tiny numbers introduces delays in the associated pipelines and may even require additional stages and chip area to accommodate the tiny result processing requirements. In effect, all additions and multiplications are penalized by handling frequent tiny results.

Therefore, there is a need in the art for improved microprocessor architectures capable of handling tiny, denormal results more efficiently. In particular, there is a need for improved microprocessor architectures containing pipelined floating point units that are capable of handling denormal (tiny) results efficiently without requiring complex rounding units in each pipeline to handle the rounding of denormal numbers.

SUMMARY OF THE INVENTION

The limitations inherent in the prior art described above are overcome by the present invention which provides a denormal handling circuit for use in a pipelined floating point unit comprising at least one of an addition pipe and a multiplication pipe. In an advantageous embodiment of the present invention, the denormal result handling circuit comprises: 1) a denormal condition detection circuit associated with at least one of the addition pipe and the multiplication pipe capable of examining a first operand and a second operand loaded into the at least one of the addition pipe and the multiplication pipe and detecting a potential denormal condition, the potential denormal condition indicating that a calculated result generated from the first and second operands may be a denormal result, wherein the denormal condition detection circuit, in response to the detection of the potential denormal condition, prevents an additional operation from being loaded into the at least one of the addition pipe and the multiplication pipe; and 2) a complex rounding unit capable of receiving the calculated result from the at least one of the addition pipe and the multiplication pipe and, in response to the detection of the potential denormal condition, rounding the calculated result.

In one embodiment of the present invention, the denormal condition detection circuit is capable of disabling a simple rounding circuit associated with the at least one of the addition pipe and the multiplication pipe.

In another embodiment of the present invention, the denormal condition detection circuit detects the potential denormal condition if the first operand and the second operand are both normal.

In still another embodiment of the present invention, the denormal condition detection circuit detects the potential denormal condition if the first operand and the second operand are both denormal.

In yet another embodiment of the present invention, the denormal condition detection circuit detects the potential denormal condition if the first operand and the second operand are both pseudo-denormal.

In a further embodiment of the present invention, the pipelined floating point unit comprises an addition pipe and a multiplication pipe and the denormal result handling circuit comprises a first denormal condition detection circuit associated with the addition pipe and a second denormal condition detection circuit associated with the multiplication pipe.

In a still further embodiment of the present invention, the first denormal condition detection circuit is capable of disabling a first simple rounding circuit associated with the addition pipe.

In a yet further embodiment of the present invention, the second denormal condition detection circuit is capable of disabling a second simple rounding circuit associated with the multiplication pipe.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
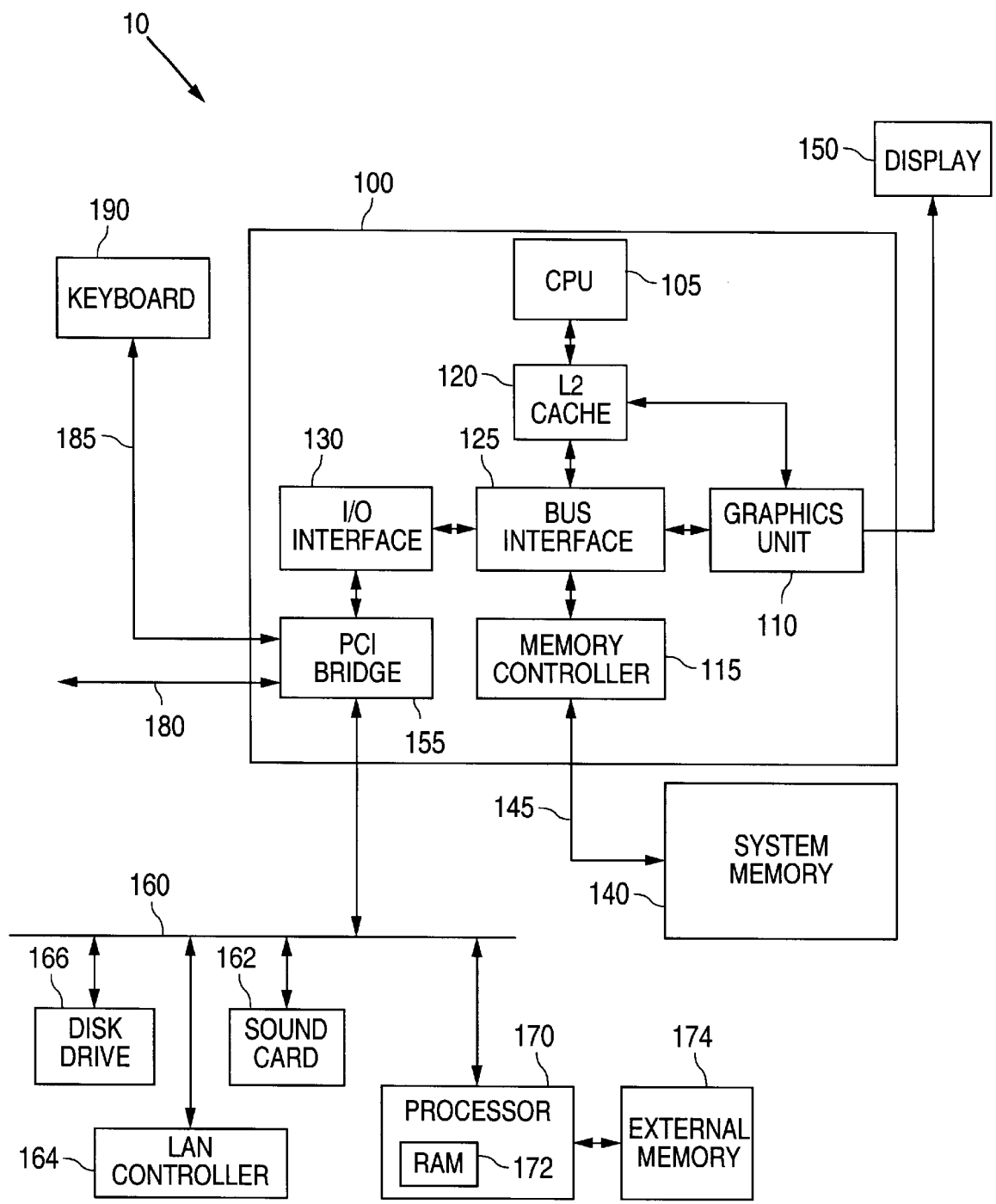
FIG. 1 is a block diagram of an exemplary processing system, which includes an integrated microprocessor according to one embodiment of the present invention.

FIG. 1 is a block diagram of processing system 10, which includes integrated microprocessor 100, according to one embodiment of the present invention. Integrated microprocessor 100 comprises central processing unit (CPU) 105, which has dual integer and dual floating point execution units, separate load/store and branch units, and L1 instruction and data caches. Microprocessor 100 also comprises graphics unit 110, system memory controller 115, and L2 cache 120, which is shared by CPU 105 and graphics unit 110. Graphics unit 110, system memory controller 115, and L2 cache 120 may be integrated onto the same die as microprocessor 105. Bus interface unit 125 connects CPU 105, graphics unit 110, and L2 cache 120 to memory controller 115. Bus interface unit 125 also may be integrated onto the same die as microprocessor 105.

Integrated memory controller 115 bridges microprocessor 100 to system memory 140, and may provide data compression and/or decompression to reduce bus traffic over external memory bus 145 which preferably, although not exclusively, has a RAMbus™, fast SDRAM or other type protocol. Integrated graphics unit 110 provides TFT, DSTN, RGB, and other types of video output to drive display 150.

Bus interface unit 125 connects microprocessor 100 through I/O interface 130 to PCI bridge 155, which has a conventional peripheral component interconnect (PCI) bus interface on PCI bus 160 to one or more peripherals, such as sound card 162, LAN controller 164, disk drive 166, and peripheral processor 170, among others. Bus interface unit 125 also connects fast serial link 180 and relatively slow I/O port 185 to microprocessor 100 (via I/O interface 130 and PCI bridge 155). Fast serial link 180 may be, for example, an IEEE 1394 bus (i.e., "Firewire") and/or a universal serial bus ("USB"). I/O port 185 is used to connect peripherals to microprocessor 100, such as keyboard 190 and/or a mouse. In some embodiments, PCI bridge 155 may integrate local bus functions such as sound, disk drive control, modem; network adapter, and the like.

Peripheral processor 170 may be anyone of a wide variety of processing devices that may be implemented in processing system 10. For example, peripheral processor 170 may be a digital signal processor (DSP) that provides a capability for communicating with external devices, such as a digital subscriber line (DSL). Alternatively, peripheral processor 170 may be a dedicated microprocessor that performs only a limited set of function(s) and that is subordinate to microprocessor 100. Peripheral processor 170 may also be a microcontroller containing an on-board RAM 172, or an ASIC circuit that is capable of executing instructions retrieved from a memory.

Figure 2:
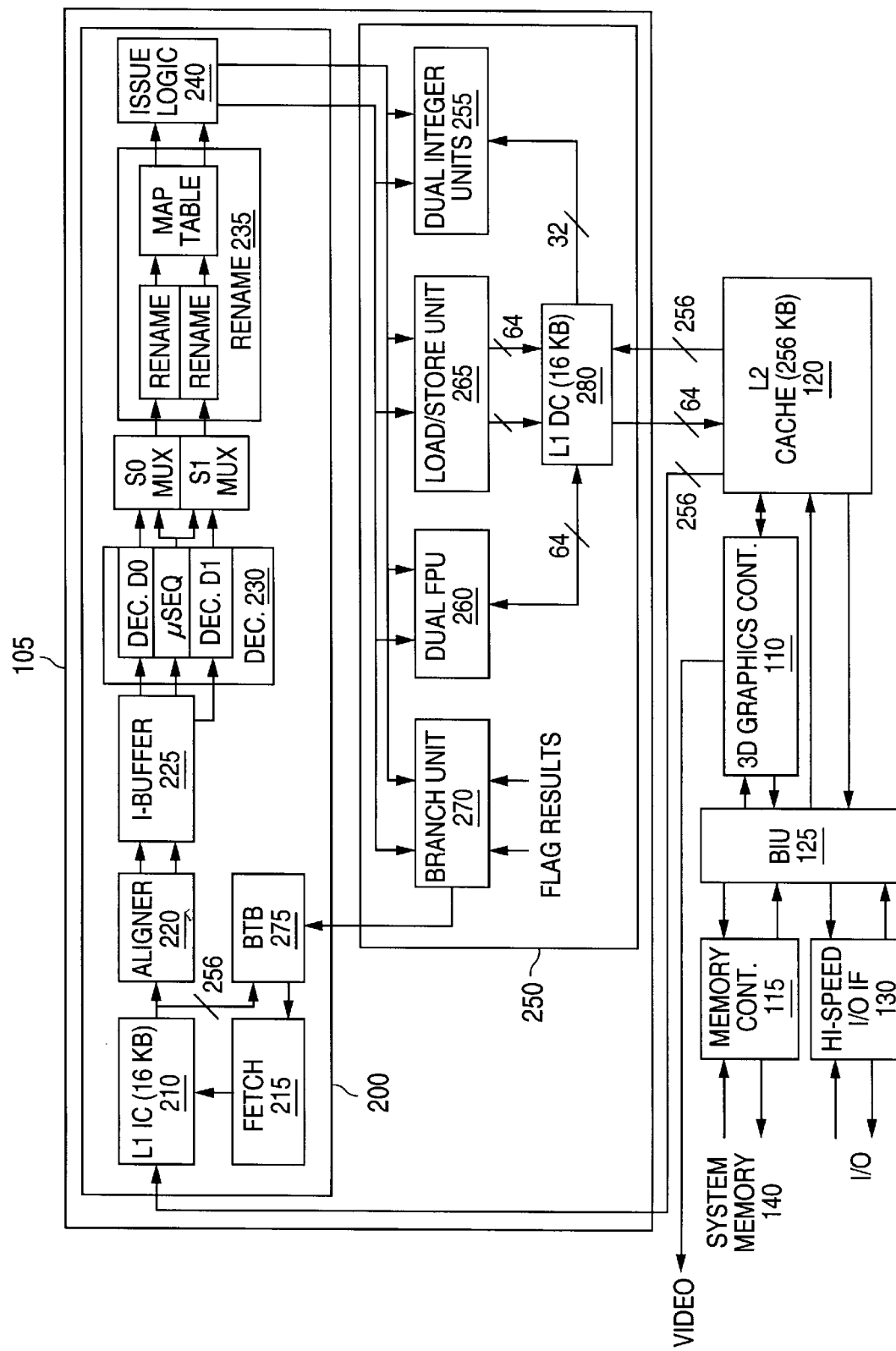
FIG. 2 illustrates in more detail the exemplary integrated processor in FIG. 1, including the CPU, graphics controller, memory controller, and L2 unified cache, according to one embodiment of the present invention.

FIG. 2 illustrates in more detail selected portions of exemplary integrated processor 100, including CPU 105, graphics controller 110, memory controller 115, and L2 unified cache 120 (e.g., 256 KB in size). CPU 105 includes an execution pipeline with instruction decode/dispatch logic 200 and functional units 250.

Instruction decode/dispatch logic 200 decodes variable length 86 instructions into nodes (operations) each containing source, destination, and control logic. Each instruction maps into one or more nodes, which are formed into checkpoints for issue in parallel to functional units 250. The exemplary execution pipeline includes dual integer units (EX) 255, dual pipelined floating point units (FP) 260, load/store (LDST) unit 265, and branch (BR) unit 270. Hence, a single checkpoint can include up to 2 EX, 2 FP, 1 LDST, and 1 BR nodes which can be issued in parallel. L1 data cache (DC) 280 (e.g., 16 KB in size) receives data requests from LDST unit 265 and, in the case of an L1 hit, supplies the requested data to appropriate EX or FP unit.

BR unit 270 executes branch operations based on flag results from the EX units. Predicted (taken/not-taken) and not-predicted (undetected) branches are resolved (mispredictions incur, for example, a 12 clock penalty) and branch information is supplied to BTB 275, including branch address, target address, and resolution (taken or not taken). BTB 275 includes a 1 KB target cache, a 7-bit history and prediction ROM, and a 16-entry return stack.

Instruction decode/dispatch logic 200 includes L1 instruction cache (IC) 210 (e.g., 16 KB in size) which stores 32-byte cache lines (8 dwords/4 qwords). During each fetch operation, fetch unit 215 fetches a cache line of 32 instruction bytes from the L1 instruction cache to aligner logic 220. Fetch unit 215 either (a) generates a fetch address by incrementing the previous fetch address (sequential fetch) or, (b) if the previous fetch address hit in BTB 275, switches the code stream by supplying the fetch address for the cache line containing the target address provided by BTB 275. Fetch unit 215 supplies a linear address simultaneously to L1 instruction cache 210 and BTB 275. A two-level translation look-aside buffer (TLB) structure (a 32-entry L1 instruction TLB and a 256-entry shared L2 TLB) supplies a corresponding physical address to the L1 cache to complete cache access.

Aligner logic 220 identifies up to two x86 variable length instructions per clock. Instructions are buffered in instruction buffer 225, along with decode and issue constraints. Decoder 230 transfers instructions from instruction buffer 225 to the appropriate one (as determined by decode constraints stored with the instruction) of decoders D0, D1, and uSEQ (a microsequencer). Decoders D0 and D1 define two decode slots (or paths) through MUX S0 and MUX S1, with the uSEQ decoder feeding nodes into both slots simultaneously.

Decoders D0 and D1 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to decoder D0. The uSEQ decoder handles instructions that decode into more than two nodes/operations (e.g., far calls/returns, irets, segment register loads, floating point divides, floating point transcendentals) Each such sequence of nodes are organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units. Most instructions can be dual issued with the nodes for each in the same checkpoint. Up to 16 checkpoints may be active (i.e., issued to functional units). Nodes are issued into reservation stations in each functional unit. Once in the reservation stations, the nodes complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support standard x87 floating point instruction execution. FPU0 includes a pipelined FAdder and FPU1 includes a pipelined Fmultipler. Results are forwarded between EX0/EX1 and FPU0/FPU1 in a single cycle.

LDST unit 265 executes memory reference operations as loads/stores to/from data cache 280 (or L2 cache 120). LDST unit 265 performs pipelined linear address calculations and physical (paged) address translations, followed by data cache access with the physical (translated) address. Address translations are performed in order using a two-level TLB structure (a 32 entry L1 data TLB and the 256 entry shared L2 TLB). Up to four pending L1 misses can be outstanding. Missed data returns out of order (from either L2 cache 120 or system memory 140).

Exemplary 16 KB L1 instruction cache 210 is single-ported 4-way associative, with 2 pending misses. Exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, L2 cache 120 transfers an entire cache line (32 bytes/256 bits) in one cycle with a 7 clock access latency for L1 misses that hit in L2 cache 120.

Exemplary 256 KB L2 cache 120 is 8-way associative and 8-way interleaved. Each interleave supports one L1 (code/data) miss per 15-1 cycle, and either one L1 store or one L2 fill per cycle. Portions or all of 2 of the 8 ways may be locked down for use by graphics controller 110.

For integer register-to-register operations, the execution pipeline is eleven (11) stages from code fetch to completion: two cache access stages (IC1 and IC2), two alignment stages (AL1 and AL2), three decode/rename stages (DEC0-DEC2), checkpoint issue stage (ISS), and reservation stage (RS), followed by the execute and result write-back/forward stages (EX and WB). For integer register-memory operations, the LDST unit 265 pipeline adds an additional four stages between RS and EX: address calculation (AC), translation (XL), and data cache access and drive back DC and DB. The floating point adder pipeline comprises four stages and the floating point multiply pipeline comprises five stages.

Figure 3:
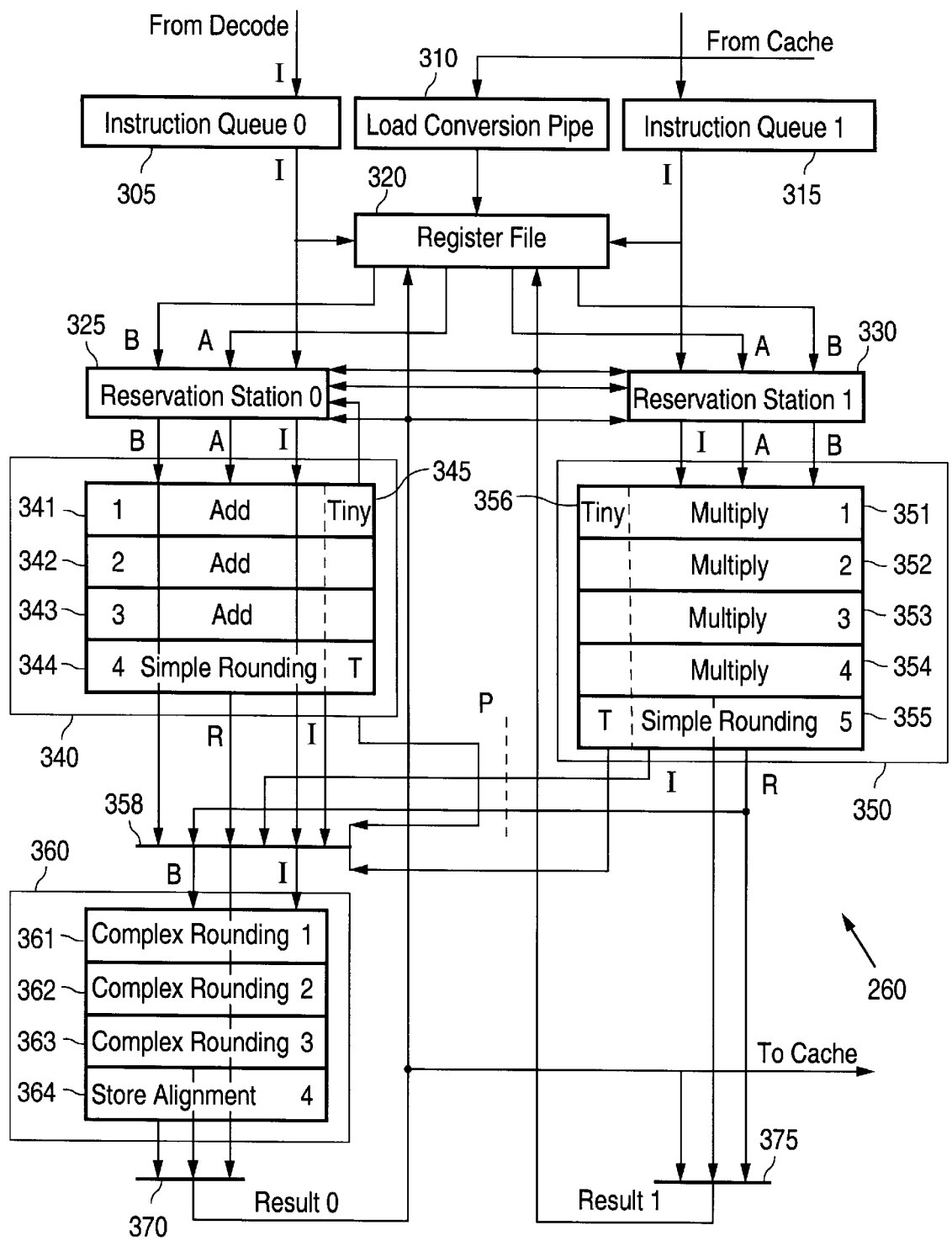
FIG. 3 is a block diagram of a representative floating point unit in the exemplary dual floating point unit according to one embodiment of the present invention.

FIG. 3 illustrates a representative portion of dual floating point unit 260 according to one embodiment of the present invention. FPU 260 comprises instruction queue 305 (IQ0), load conversion pipe 310, instruction queue 315 (IQ1) and register file 320. FPU 260 also comprises reservation station 325 (RS0), reservation station 330 (RS1), add pipe 340, and multiply pipe 350. FPU 260 further comprises store conversion pipe 360, multiplexer (MUX) 358, MUX 370, and MUX 375.

Add pipe 340 comprises three addition stages 341, 342, and 343, simple rounding stage 344, and tiny (denormal) condition detection circuit 345. Multiply pipe 350 comprises four multiply stages 351, 352, 353, and 354, simple rounding stage 355, and tiny (denormal) condition detection circuit 356. Store conversion pipe 360 comprises complex rounding stages 361, 362 and 363, and store alignment stage 364.

FPU 260 loads instructions from instruction decode/dispatch logic 200 into IQ0 and IQ1 and loads data from L1 data cache 280 into load conversion pipe 310. Load conversion pipe 310 converts the received cache data to internal formats for operands A and B and transfers this data to register file 320. FPU 260 issues instructions by independently transferring data from reservation station 325 to add pipe 340 or store conversion pipe 360 (depending upon the type of the instruction) and from reservation station 330 to multiply pipe 350 when an instructions(s) and all operands are present in the reservation station(s). For each reservation station, as an instruction is issued to a pipe, the next instruction is removed from the corresponding instruction queue 305 and/or instruction queue 315; the operands are read from the register file 320; and the instruction along with the operands are stored in the reservation station.

When addition with rounding is enabled, tiny condition detection circuit 345 examines operands A and B for add stage 341 to determine whether the addition result may be tiny. This occurs when operands A and B are both legal encodings (not an unsupported format), both non-zero, and both operand exponents are less than the tiny threshold. The range of the result embodied in the instruction, if not implied, determines the minimum value of this threshold. This threshold is the minimum unbiased exponent for a normal number in this range, plus the bias for the register file or internal format, plus 1, plus the maximum amount of leading zero correction which could occur due to massive cancellation (which is the precision of internal format plus 1).

As an example, assume the result is to be produced according to the parameters of 80-bit double extended format. The minimum unbiased exponent for a normal number in this format is equal to $2^{14}-2^1$ preceded by the minus (−) sign or −16,382. The bias for internal format is $2^{16}-2^0$ or 65,535. The maximum amount of leading zero correction is 70. Thus, tiny condition detection circuit 345 examines the exponents of operands A and B to see if they are both less than −16,382+65,535+1+70 (i.e., less than 49,224) to determine if both exponents are below the tiny threshold. The time required for tiny condition detection circuit 345 to determine whether the potential for a tiny result is present or not is less than one-half of the processing clock cycle. This leaves the other half of the first clock cycle of the add pipe available for signal transfer and processing.

When a potential tiny result is detected by tiny condition detection circuit 345, tiny condition detection circuit 345 generates a signal that disables simple rounding stage 344 in add pipe 340, so that the unrounded potentially tiny result, R, from the add operation is transferred to store conversion pipe 360. Additionally, the signal generated by tiny condition detection circuit 345 disables RS0, which halts the issuance of subsequent addition, store conversion, and other resource conflicting operations when a potentially tiny result is being processed by FPU 260. Multiplexer 358 selectively transfers one of the pairs' instruction I and operand B from RS0 325 or instruction I and result R from simple rounding stage 344 within add pipe 340.

Tiny result detection in multiply pipe 350 operates in a manner similar to add pipe 340. When multiply rounding is enabled, tiny condition detection circuit 356 examines operands A and B to determine whether the multiplication result may potentially be tiny. This occurs when both operands A and B are legal encodings and both are non-zero, non-infinity, non NaN numeric values, and the properly biased sum of the exponents of operands A and B is less than the tiny threshold. The range of the result embodied in the instruction, if not implied, determines the minimum value of this threshold. This is the minimum unbiased exponent for a normal number in this range, plus the bias for the register file or internal format.

As an example, assume the result is to be produced according to the parameters of 80-bit double extended format. The minimum unbiased exponent for a normal number in this format is equal to $2^{14}-2^1$ preceded by the minus (−) sign or −16,382. The bias for internal format is equal to $2^{16}-2^0$ or 65,535. When determining the potential for a tiny result in multiply pipe 350, tiny condition detection circuit 356 adds the A and B operand exponents, subtracts 65,535, and compares the result to see if it is less than (−16,382+65,535) or 49,153. Thus, tiny condition detection circuit 356 determines that operand exponents are below the tiny threshold when the sum of exponents of operand A and B minus 65,535 for multiply stage 351 is less than 49,153.

In order to detect potential tiny results in multiply pipe 356 in one-half clock cycle or less, tiny condition detection circuit 356 may use a greatly simplified three-way adder that adds exponents of operands A and B and then adds 16,384 by inserting a one in bit position 14. Tiny condition detection circuit 356 then examines the result to see if it is equal to or greater than the quantity: 2*65,535+2=131,072. The result is equal to or greater than 131,072 when the most significant bit (MSB) (bit 17) of the result is 1.

When a potential tiny result is detected by tiny condition detection circuit 356, tiny condition detection circuit 356 generates a signal that disable simple rounding stage 355, so that the unrounded potentially tiny result from multiply pipe 350 is transferred to store conversion pipe 360. Additionally, the signal generated by tiny condition detection circuit 356 disables RS1 from issuing subsequent multiplication instructions, disables RS0 from issuing subsequent add or store conversion instructions, and disables either from issuing other resource conflicting operations. Multiplexer 358 selectively transfers one of the pairs' instruction I and operand B from RS0 or instruction I and result R from simple rounding stage within multiply pipe 350.

Store conversion pipe 360 receives the unrounded potentially tiny result, R, from either add pipe 340 or multiply pipe 350 via multiplexer 358 and performs complex 3-stage rounding of the potentially tiny result. MUX 370 transfers the rounded output of complex rounding stage 363 to register file 320 and optionally to RS0 and/or to RS0 and to RS1 for dependent instructions (and optionally to L1 DC cache 280 for store conversions to memory).

Figure 4:
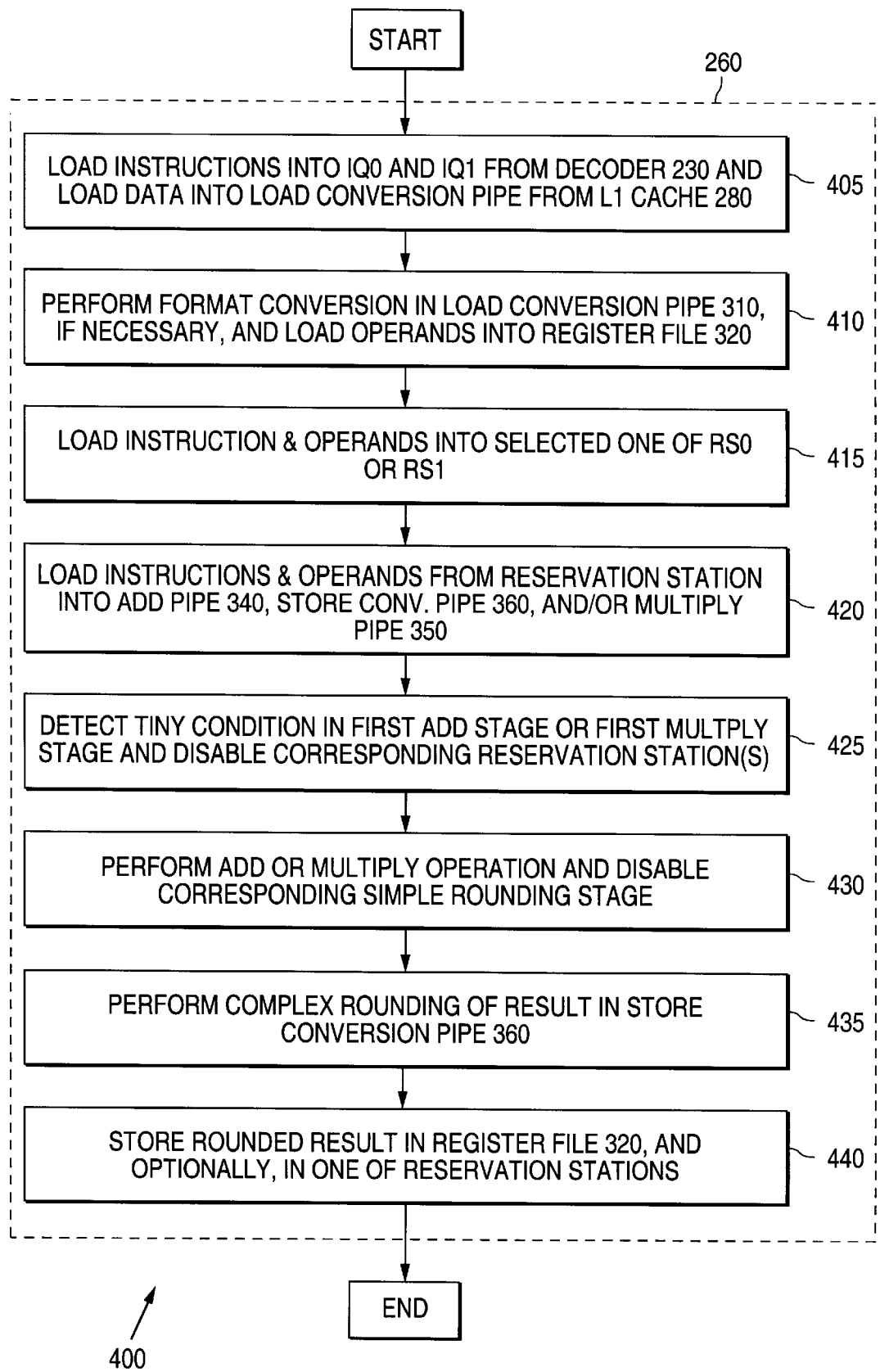
FIG. 4 is a flow chart illustrating the operation of the representative floating point unit according to one embodiment of the present invention.

FIG. 4 depicts flow chart 400, which illustrates the operation of representative floating point unit 260 according to one embodiment of the present invention. Initially, FPU 260 loads instructions from decoder 230 into IQ0 and IQ1. FPU 260 also loads data from L1 DC cache 280 into load conversion pipe 310 (process step 405). Next, load conversion pipe 310 perform necessary format conversions, if any, on stored data and then loads the resultant operands into register file 320 for subsequent access (process step 410).

Next, the instruction and operands are loaded into RS0 or RS1 from register file 320 and from one of IQ0 or IQ1 (process step 415). The instruction and operands in RS0 are then loaded into add pipe 340 or store conversion pipe 360, depending on the pending instruction in RS0 and availability of operands. Similarly, the instruction and operands in RS1 are independently loaded into multiply pipe 350, depending upon the availability of operands (process 420). Next, the tiny condition detection circuit in add pipe 340 (or multiply pipe 350) examines the operands A and B in add stage 341 (or multiply stage 351). If a tiny condition is detected, add pipe 340 disables the reservation station RS0 (or multiply pipe 350 disables reservation stations RS0 and RS1), so that no further instructions may be loaded into the affected reservation stations until the potentially tiny result(s) has/have been generated (process step 425).

When potential tiny result is detected, add pipe 340 (or multiply pipe 350) also disables simple rounding stage 344 (or simple rounding stage 355), so that the potentially tiny result is not rounded in the simple rounders. Next, add pipe 345 (or multiply pipe 350) adds (or multiplies) the operands to generate an unrounded potentially tiny result (process step 430). Subsequently, store conversion pipe 360 receives the unrounded potentially tiny result as an operand which it subsequently rounds according to instructions for complex rounding of tiny results (process step 435). When the complex rounding process is complete, the rounded result is stored in register file 320 and may optionally be forwarded to RS0 and RS1 for dependent instructions (process step 440).

Although the present invention has been described in detail, those skilled in the art should understand that they can make various changes, substitutions and alterations herein without departing from the spirit and scope of the invention in its broadest form.

What is claimed is:

1. For use in a pipelined floating point unit comprising at least one of an addition pipe and a multiplication pipe, a denormal result handling circuit comprising:
   a denormal condition detection circuit associated with at least one of said addition pipe and said multiplication pipe capable of examining a first operand and a second operand loaded into said at least one of said addition pipe and said multiplication pipe and detecting a potential denormal condition, said potential denormal condition indicating that a calculated result generated from said first and second operands may be a denormal result, wherein said denormal condition detection circuit, in response to said detection of said potential denormal condition, prevents an additional operation from being loaded into said at least one of said addition pipe and said multiplication pipe; and
   a complex rounding unit capable of receiving said calculated result from said at least one of said addition pipe and said multiplication pipe and, in response to said detection of said potential denormal condition, rounding said calculated result.

2. The denormal result handling circuit as set forth in claim 1 wherein said denormal condition detection circuit is capable of disabling a simple rounding circuit associated with said at least one of said addition pipe and said multiplication pipe.

3. The denormal result handling circuit as set forth in claim 1 wherein said denormal condition detection circuit detects said potential denormal condition if said first operand and said second operand are both normal.

4. The denormal result handling circuit as set forth in claim 1 wherein said denormal condition detection circuit detects said potential denormal condition if said first operand and said second operand are both denormal.

5. The denormal result handling circuit as set forth in claim 1 wherein said denormal condition detection circuit detects said potential denormal condition if said first operand and said second operand are both pseudo-denormal.

6. The denormal result handling circuit as set forth in claim 1 wherein said pipelined floating point unit comprises an addition pipe and a multiplication pipe and said denormal result handling circuit comprises a first denormal condition detection circuit associated with said addition pipe and a second denormal condition detection circuit associated with said multiplication pipe.

7. The denormal result handling circuit as set forth in claim 6 wherein said first denormal condition detection circuit is capable of disabling a first simple rounding circuit associated with said addition pipe.

8. The denormal result handling circuit as set forth in claim 7 wherein said second denormal condition detection circuit is capable of disabling a second simple rounding circuit associated with said multiplication pipe.

9. A processor comprising:
   a pipelined floating point unit capable of processing denormal numbers comprising:
      at least one of an addition pipe and a multiplication pipe; and
      a denormal condition detection circuit associated with at least one of said addition pipe and said multiplication pipe capable of examining a first operand and a second operand loaded into said at least one of said addition pipe and said multiplication pipe and detecting a potential denormal condition, said potential denormal condition indicating that a calculated result generated from said first and second operands may be a denormal result, wherein said denormal condition detection circuit, in response to said detection of said potential denormal condition, prevents an additional operation from being loaded into said at least one of said addition pipe and said multiplication pipe; and
      a complex rounding unit capable of receiving said calculated result from said at least one of said addition pipe and said multiplication pipe and, in response to said detection of said potential denormal condition, rounding said calculated result.

10. The processor as set forth in claim 9 wherein said denormal condition detection circuit is capable of disabling a simple rounding circuit associated with said at least one of said addition pipe and said multiplication pipe.

11. The processor as set forth in claim 9 wherein said denormal condition detection circuit detects said potential denormal condition if said first operand and said second operand are both normal.

12. The processor as set forth in claim 9 wherein said denormal condition detection circuit detects said potential denormal condition if said first operand and said second operand are both denormal.

13. The processor as set forth in claim 9 wherein said denormal condition detection circuit detects said potential denormal condition if said first operand and said second operand are both pseudo-denormal.

14. The processor as set forth in claim 9 wherein said pipelined floating point unit comprises:
    said addition pipe;
    said multiplication pipe;
    a first denormal condition detection circuit associated with said addition pipe; and
    a second denormal condition detection circuit associated with said multiplication pipe.

15. The processor as set forth in claim 14 wherein said first denormal condition detection circuit is capable of disabling a first simple rounding circuit associated with said addition pipe.

16. The processor as set forth in claim 15 wherein said second denormal condition detection circuit is capable of disabling a second simple rounding circuit associated with said multiplication pipe.

17. For use in a pipelined floating point unit comprising at least one of an addition pipe and a multiplication pipe, a method of handling a denormal result comprising the steps of:

examining a first operand and a second operand loaded into the at least one of the addition pipe and the multiplication pipe;

detecting a potential denormal condition, the potential denormal condition indicating that a calculated result generated from the first and second operands may be a denormal result;

in response to the detection of the potential denormal condition, preventing an additional operation from being loaded into the at least one of the addition pipe and the multiplication pipe; and rounding the calculated result in a complex rounding unit capable of receiving the calculated result from the at least one of the addition pipe and the multiplication pipe.

18. The method as set forth in claim 17 wherein the step of detecting the potential denormal condition comprises the substep of detecting if the first operand and the second operand are both normal.

19. The method as set forth in claim 17 wherein the step of detecting the potential denormal condition comprises the substep of detecting if the first operand and the second operand are both denormal.

20. The method as set forth in claim 17 wherein the step of detecting the potential denormal condition comprises the substeps of detecting if the first operand and the second operand are both pseudo-denormal.

* * * * *

UNITED STATES PATENT AND TRADEMARK OFFICE
CERTIFICATE OF CORRECTION

PATENT NO. : 6,714,957 B1
DATED : March 30, 2004
INVENTOR(S) : Jeffrey A. Lohman It is certified that error appears in the above-identified patent and that said Letters Patent is hereby corrected as shown below:

Column 5,
Line 6, delete "86" and insert -- x86 --; and

Column 6,
Line 39, delete "15-1".

Signed and Sealed this

Fifteenth Day of November, 2005

JON W. DUDAS
*Director of the United States Patent and Trademark Office*